April 14, 1942.  L. T. ROSS  2,279,641
SHOULDER FINISHING APPARATUS
Filed July 14, 1941  2 Sheets-Sheet 2
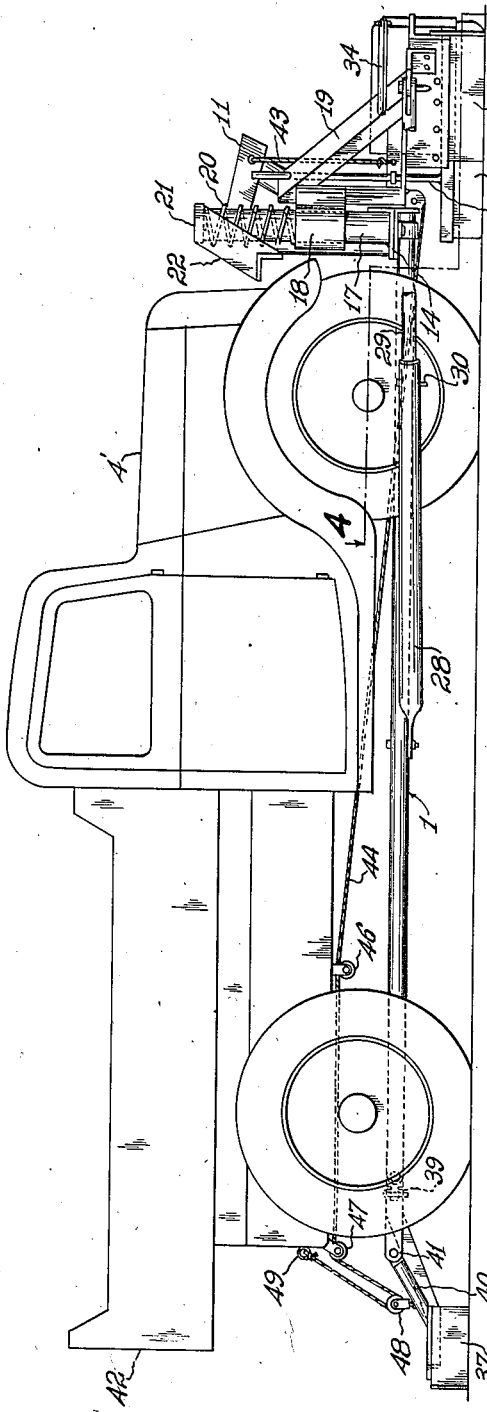
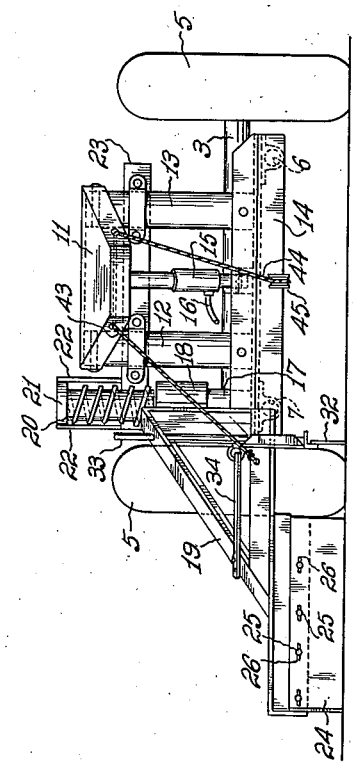
INVENTOR.
Lester T. Ross
BY Robb & Robb
ATTORNEYS Patented Apr. 14, 1942

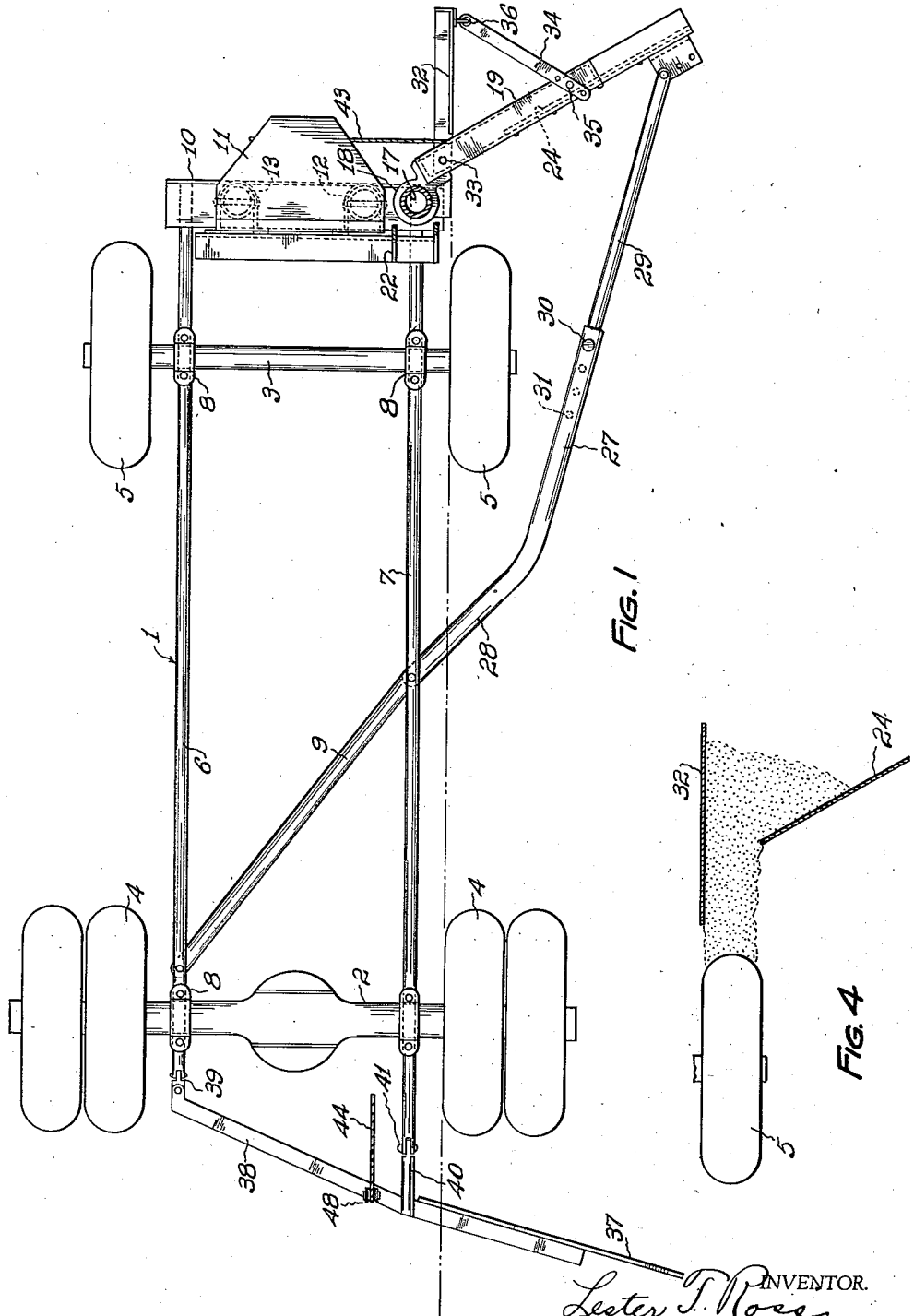

2,279,641

UNITED STATES PATENT OFFICE 2,279,641

SHOULDER FINISHING APPARATUS

Lester T. Ross, Crestline, Ohio, assignor to The Burch Corporation, Crestline, Ohio, a corporation Application July 14, 1941, Serial No. 402,378

12 Claims. (Cl. 37—146)

This invention relates to shoulder finishing apparatus and, more particularly, to improvements in shoulder finishing apparatus adapted for use in connection with motor vehicle trucks.

In highway road maintenance, it is well known that work has to be periodically performed on the berms or shoulders along the edges of paved roads in order to maintain the same level with the surface of the paved road. Special machines have been designed for removing high spots and filling in low spots along the berm but, the use of apparatus adapted to be mounted on a motor truck vehicle for this purpose has also been employed, the apparatus which is mounted on trucks being less costly and more rapid in its operation.

The apparatus employed for the purpose of finishing road shoulders usually comprises a scraper blade which extends outwardly over the edge of the road and is operative to scrape and move material inwardly toward the edge of the road to fill in the cavities which usually occur adjacent the edge of the paved road. A second blade is positioned behind the first blade for the purpose of removing high spots on the berm adjacent the edge of the road and for removing the excess material moved inwardly by the first scraping blade. One of the disadvantages of apparatus operating in this manner is that the cavities along the edge of the road are filled in with loose material which is likely to be removed by cars passing along the edge of the berm.

A further disadvantage of scraping apparatus which is mounted on a truck is that such apparatus has to be provided with special supports which involves difficult and time consuming installing operations and disassembling operations when it is desired to use the truck for purposes other than for finishing road shoulders. The supports by which the apparatus is secured to the truck have to be specially designed in order to provide the desired strength and rigidity for road finishing apparatus. Moreover, such apparatus must be provided with mechanism for raising and lowering the same from operative to inoperative positions. By reason of the problems encountered, the apparatus when in operative position extends outwardly from the side of the truck a considerable distance and when being used for a scraping operation, it is necessary that the truck take up a larger portion of the road than is desired, in order that the scraping apparatus be properly positioned with respect to the berm of the road.

One of the principal objects of this invention is to provide shoulder finishing apparatus for use with a truck which is so positioned with respect to the wheels of the truck that the wheels may be employed for compacting the dirt moved into cavities along the edge of the road before the leveling action takes place.

A further object is to provide a novel form of mounting or motor truck support for shoulder finishing apparatus which enables the truck to perform a shoulder finishing operation without consuming an undesirably large portion of the surface of the paved road.

A further object is to employ supports used in connection with snow plow apparatus as the support for the shoulder finishing apparatus.

A further object is to provide shoulder finishing apparatus wherein the scraping blade employed for filling the cavities along the edge of the paved road is positioned forwardly of the wheels on one side of the motor truck and the blade employed for leveling off the shoulder or berm is positioned rearwardly of the motor vehicle wheels.

Other objects and advantages of the invention will become apparent during the following description.

In the drawings there is shown a preferred embodiment of the invention. In this showing:

Figure 1 is a plan view of the shoulder finishing apparatus showing the supports therefor and the manner in which the supports are attached to the axles of a motor truck vehicle.

Figure 2 is a side elevational view of a motor truck vehicle equipped with shoulder finishing apparatus constructed in accordance with the principles of this invention and showing such apparatus in position for a shoulder finishing operation.

Figure 3 is a front elevational view of the finishing apparatus shown in Figure 2; and, Figure 4 is a diagrammatic view illustrating the position of the scraping blades at the front of the vehicle and the manner in which these blades operate on the material to position the same for a compacting action by the wheels of the vehicle during forward movement of the vehicle.

The shoulder finishing apparatus of this invention has been designed specially for cooperation with a supporting frame used in connection with another type of apparatus in order to eliminate the difficulties incident to providing special supports for securing the shoulder finishing apparatus to a truck frame. In order to employ a truck as operating mechanism for a snow plow, subframes are provided which are secured to the axis of a motor truck as a support for the snow plow, the truck chassis frame not being readily adaptable for use with a snow plow. In constructions of this kind, the snow plow is mounted at the front of the sub-frame and when it is not desired to use the truck for removing snow, the plow is merely removed from the front end of the truck and the sub-frame is left in position secured to the axles of the truck for subsequent use when necessary.

Referring to Figure 1, there is shown a sub-frame of the character referred to and is indicated as a whole by the numeral 1. This frame is provided as a support for snow plow apparatus and is preferably constructed in accordance with the disclosures of my Patents No. 1,930,862 and No. 2,029,545, reference being made to these patents for a detailed showing of the construction of the sub-frame 1.

The frame 1 is adapted to be secured to the axles 2 and 3 of a motor truck 4', the axles 2 and 3 being respectively provided with wheeled supports 4 and 5.

The sub-frame 1 comprises side members 6 and 7 which are rigidly secured to the underside of the axles 2 and 3 by connecting devices 8, the side members 6 and 7 being further connected together by a bracing member 9 rigidly connected to these members and extending diagonally with respect thereto.

The side members 6 and 7 extend beyond the front axle 3 and support at their forward end a supporting structure indicated as a whole by the number 10. The supporting structure 10 is adapted to carry a snow plow (not shown) and is provided with a pivoted lifting member 11 carried by upright supports 12 and 13 mounted on a base member 14 extending transversely of the front ends of the side members 6 and 7. A hydraulic lifting cylinder 15 is provided for raising the pivoted lifting member to raise a snow plow to and from operative and inoperative positions when the same is mounted on the supporting structure 10, a conduit 16 and suitable controls (not shown) being provided for controlling the admission of hydraulic fluid pressure to and from the hydraulic cylinder 15.

The finishing apparatus of this invention is particularly constructed for use in connection with the sub-frame 1 and, in order to adapt the sub-frame 1 for this purpose, a vertical cylindrical supporting member 17 is mounted on the base member 14. The cylindrical member 17 is adapted to be telescopically connected with a sleeve 18 integrally secured to a scraper frame 19. A coil spring 20 is positioned intermediate the sleeve 18 and a cap 21 on the top of the cylindrical member 17 for resiliently exerting a force tending to maintain the sleeve 18 and frame 19 in a lowered position. The cap 21 also serves as a brace for the cylindrical support 17, bracing members 22 being rigidly connected to the cap 21 and to a cross member 23 constituting a part of the supporting structure 10.

The frame 19 extends outwardly from the sleeve 18 as best shown in Figure 1 and, at the lower part thereof, a scraping blade 24 is mounted by means of bolts 25 or other suitable connecting means. The openings 26 through which the bolts 25 extend are preferably slotted to permit of adjustment of the blade 24 with respect to the frame 19. Since the support 17 and sleeve 18 provide a hinge connection permitting pivotal movement of the frame 19 and scraping blade 24 with respect to the support 17, an adjustable member 27 is provided for holding the frame 19 in a fixed position with respect to the support 17. The adjusting member 27 and member 28 are pivotally connected to the side member 7 of the sub-frame 1 and a member 29 is pivotally connected to the frame 19 and slidably or telescopically receivable in an end of the member 28. The members 28 and 29 are connected together by means of a pin 30 which may be inserted in a selected one of a plurality of openings 31 according to the angular adjustment to be made. The adjusting member 27 in addition to serving as a means for varying the angular adjustment of the frame 19, also operates to provide a brace for the frame 19 during scraping operations.

The frame 19 is also provided with a deflecting blade 32 which is hingedly connected thereto by means of a rod 33 which extends through aligned openings formed in parts of the frame 19, the rod 33 permitting vertical movement of the blade 32 with respect to the frame 19. The angular position of the deflecting blade or member 32 with respect to the frame 19 and the scraping blade 24 is controlled by means of the member 34 which has an adjustable connection 35 with the frame 19 to permit an adjustment of the position of the member 32 for different adjustments of the blade 24, the connection 36 of the member 34 with the deflecting member 32 permitting limited vertical movement of the member 32 with respect to the frame 19.

As best shown in Figures 3 and 4, the scraping blade 24 and deflecting blade 32 are adapted to occupy a particular position with respect to the wheels 5 of the truck 4. The inner edge of the scraping blade 24 terminates adjacent the outer edge of the wheel 5 and the blade 32 has its deflecting surface positioned substantially parallel to a side of the truck chassis and is positioned adjacent the inner edge of the wheel 5. Since the scraping blade 24 in operative position will extend forwardly with respect to the vehicle, it will scrape dirt inwardly toward the edge of the road against the plate 32, the plate 32 being designed to ride on the edge of the paved road and prevent movement of material onto the road. In this manner, a mound of dirt will be formed adjacent the edges of the paved road during forward movement of the truck, and this dirt will be compacted by the truck wheels passing thereover.

A blade 37 is provided rearwardly of the truck for effecting a leveling action of the dirt after a compacting action by the wheels of the motor truck. The blade 37 is angularly inclined and extends rearwardly with respect to the truck for moving excess quantities of dirt away from the road during the leveling action. The blade 37 is mounted on an arm 38 which is universally connected to the rear of the side members 6 as at 39. A bracing member 40 is secured to the member 38 for connection with the rear of the side member 7 by the pin 41. By removing the pin 41, the member 38 may then be moved about the connection 39 in to an inoperative position against the back 42 of the truck body. The pin 41 permits pivotal movement of the bracing member 40 with respect to the side member 7 in order that the blade 37 may be raised to an inoperative position.

In order that the frame 19 and blade 37 may be lifted to inoperative positions for the purpose of riding over obstacles along the edge of the road, the pivoted lifting member 11 is provided with suitable connection to the frame 19 and the blade 37. The pivoted member 11 is connected to the frame 19 by means of a cable 43 and upon an upward movement being imparted to the member 11, the frame 19 will be raised vertically against the action of the spring 20.

The member 11 is connected to the member 38 and blade 37 by a cable 44 which is reeved over a pulley 45 and is then passed underneath the truck over pulleys 46 and 47, thence around a pulley block 48 secured to the member 38 and is dead-ended at 49 to the truck body. In this manner, upon upward movement being imparted to the lifting member 11, the pulley block 48 will be raised upwardly to raise the blade 37 to an inoperative position. Upon a downward movement being permitted to the member 11, the spring 20 will be operative to resiliently force the frame 19 and blade 32 into engagement with the ground, the force of gravity being effective to move the blade 37 into engagement with the ground.

The operation of the apparatus will be apparent from the foregoing, but it will be noted that the arrangement of the frame 19 with respect to one side of the truck 4 enables the truck 4 to operate in performing a shoulder finishing operation without consuming an undesirable large amount of paved road space. The arrangement of the frame 19 and the blades 24 and 32 permit the wheels of the truck to ride along the inner edge of the berm to perform their compacting action.

It will also be apparent that the shoulder finishing apparatus of this invention may be readily removed from the truck 4 after use in shoulder finishing operations. To remove the frame 19, it is merely necessary to remove the cap 21 whereupon the frame 19 may be disengaged from the support 17. The connections of the adjustment member 27 and supporting member 38 for the rear blade 37 obviously may be made readily disengageable from the sub-frame 1 to complete the removal of the shoulder finishing apparatus.

From the foregoing, it will be apparent that there is provided shoulder finishing apparatus which may be readily used in connection with sub-frames provided on a motor truck for use in connection with snow plows. In this manner, the necessity of providing specially designed supports in order to enable the use of a motor truck in connection with shoulder finishing apparatus is thereby eliminated.

Having thus described my invention, what I claim as new and desire to secure by Letters Patent of the United States, is:

1. Grading apparatus of the character described, comprising, in combination, a truck having wheels supporting the same for movement along the edge of a paved road, a blade mounted on the truck forwardly of one of said wheels for scraping and moving dirt inwardly with respect to the truck and road upon forward movement of the truck, said wheel and blade being arranged with respect to each other in such manner that the dirt moved inwardly by said blade will be compacted by said wheel during forward movement of the truck, and a blade mounted on said truck rearwardly of said wheel for moving outwardly with respect to said truck and road excess quantities of dirt left after a compacting action by said wheel.

2. Grading apparatus of the character described, comprising, in combination, a truck having wheels supporting the same for movement along the edge of a paved road, a blade mounted on the truck forwardly of one of said wheels for scraping and moving dirt inwardly with respect to the truck and road upon forward movement of the truck, a deflecting blade mounted on said truck for movement along the edge of the road and having a deflecting surface spaced from the inner edge of said scraping blade, said surface being substantially parallel to the edge of the road and adapted to receive dirt from said scraping blade and prevent movement thereof into the road, said wheel being arranged with respect to said blades in such manner that it will traverse the space between said blades and compact the dirt moved inwardly by the scraping blade during forward movement of the truck.

3. Grading apparatus of the character described, comprising, in combination, a truck having wheels supporting the same for movement along the edge of a paved road, a blade mounted on the truck forwardly of one of said wheels for scraping and moving dirt inwardly with respect to the truck and road upon forward movement of the truck, a deflecting blade mounted on said truck for movement along the edge of the road and having a deflecting surface spaced from the inner edge of said scraping blade, said surface being substantially parallel to the edge of the road and adapted to receive dirt from said scraping blade and prevent movement thereof into the road, said wheel being arranged with respect to said blades in such manner that it will traverse the space between said blades and compact the dirt moved inwardly by the scraping blade during forward movement of the truck, and a leveling blade mounted on the truck rearwardly of said wheel for leveling and moving outwardly with respect to the truck and road excess quantities of dirt remaining after a compacting action by the wheel.

4. Apparatus as claimed in claim 2, wherein each of said blades is provided with separate mounting means permitting vertical movement of the blades with respect to the truck, and means common to both of said blades for imparting a simultaneous vertical lifting movement thereto.

5. Apparatus as claimed in claim 2, wherein each of said blades is provided with separate mounting means permitting vertical movement of the blades with respect to the truck, lifting means for imparting a vertical movement to one of said blades, and cable means connecting the other of said blades to said lifting means for imparting a lifting movement thereto simultaneously with the first of said blades.

6. Road shoulder and grading apparatus of the character described, comprising, a support, a grading unit connected to said support and comprising a frame, a scraping blade mounted on said frame, means telescopically connecting said frame to said support for horizontal swinging and vertical movements with respect thereto, and spring means cooperating with said support and frame for resiliently maintaining said scraping blade in engagement with the ground.

7. Road shoulder and grading apparatus of the class described, comprising, a support, a grading unit connected to said support and comprising a frame, a scraping blade rigidly secured to said frame, means connecting said frame to said support for horizontal swinging and vertical movements with respect thereto, spring means cooperating with said frame and said support for resiliently maintaining said scraping blade in engagement with the ground, means for adjusting the horizontal position of said frame and said scraping blade with respect to said support, a deflecting blade connected to said frame and adapted to occupy a substantially fixed position with respect to said support, and means for adjusting the position of said deflecting blade with respect to said frame to maintain the position thereof with respect to said support.

8. Apparatus of the character described, comprising, in combination, a truck chassis having wheels and axles supporting the same for movement along the ground, a supporting sub-frame secured to said chassis, a supporting member carried by said sub-frame and positioned forwardly of said wheels, and a grading unit carried by said supporting member comprising a scraping blade angularly inclined to and extending forwardly with respect to said truck chassis, the inner end of said scraping blade being positioned outwardly with respect to one of said wheels, and a deflecting blade having a surface occupying a position substantially parallel to said chassis and positioned inwardly of said wheel, said scraping blade being adapted to scrape dirt and direct the same into the space between said blades during forward movement of said truck chassis for a subsequent compacting action by said wheel.

9. Apparatus of the character described, comprising, in combination, a truck chassis having wheels and axles supporting the same for movement along the ground, a supporting sub-frame secured to said chassis, a supporting member carried by said sub-frame and positioned forwardly of said wheels, and a grading unit comprising a rigid frame connected to said supporting member for horizontal swinging movement with respect thereto, a scraping blade connected to said rigid frame, an adjustable member connected to said rigid frame and sub-frame for varying the angular positon of said rigid frame and scraping blade and for transmitting forces from said scraping blade to said sub-frame, said scraping blade being normally adapted to occupy a position angularly inclined and extending forwardly with respect to said truck chassis, the inner end of said scraping blade being positioned outwardly with respect to one of said wheels, and a deflecting blade having a surface occupying a position substantially parallel to said chassis and positioned inwardly of said wheel, said scraping blade being adapted to scrape dirt and direct the same into the space between said blades during forward movement of said truck chassis for a subsequent compacting action by said wheel.

10. Apparatus of the character described comprising, in combination, a truck chassis having wheels and axles supporting the same for movement along the ground, a supporting sub-frame secured to said chassis, a supporting member carried by said sub-frame and positioned forwardly of said wheels, and a grading unit comprising a rigid frame connected to said supporting member for vertical movement with respect thereto, a scraping blade carried by said frame spring means cooperating with said rigid frame and supporting member for resiliently maintaining said scraping blade in engagement with the ground, the inner end of said scraping blade being positioned outwardly with respect to one of said wheels, a deflecting blade having a surface occupying a position substantially parallel to said chassis and positioned inwardly of said wheel, and means connecting said deflecting blade to said rigid frame for vertical movement relative thereto independent of vertical movement of said rigid frame with respect to said supporting member, said scraping blade being adapted to scrape dirt and direct the same into the space between said blades during forward movement of said truck chassis for a subsequent compacting action by said wheel.

11. Apparatus of the character described comprising, in combination, a truck chassis having wheels and axles supporting the same for movement along the ground, a supporting sub-frame secured to said chassis, a supporting member carried by said sub-frame and positioned forwardly of said wheels, and a grading unit comprising a rigid frame connected to said supporting member for horizontal swinging movement with respect thereto, a scraping blade connected to said rigid frame, an adjustable member connected to said rigid frame and said sub-frame for varying the angular position of said rigid frame and scraping blade and for transmitting forces from said scraping blade to said sub-frame, said scraping blade being normally adapted to occupy a position angularly inclined to and extending forwardly with respect to said truck chassis, the inner end of said scraping blade being positioned outwardly with respect to one of said wheels, and a deflecting blade having a surface occupying a position substantially parallel to said chassis and positioned inwardly of said wheel, adjustable means connecting said deflecting blade to said rigid frame for varying its angular position with respect thereto to maintain the parallel relationship of said surface for various positions of said scraping blade, said scraping blade being adapted to scrape dirt and direct the same into the space between said blades during forward movement of said truck chassis for a subsequent compacting action by said wheel.

12. Apparatus of the character described comprising, in combination, a truck chassis having wheels and axles supporting the same for movement along the ground, a supporting sub-frame secured to said chassis, a supporting member carried by said sub-frame and positioned forwardly of said wheels, a grading unit comprising a rigid frame connected to said supporting member for vertical movement with respect thereto, a scraping blade carried by said rigid frame and occupying a position angularly inclined to and extending forwardly with respect to said chassis, the inner end of said scraping blade being positioned outwardly with respect to one of said wheels, a deflecting blade having a surface occupying a position substantially parallel to said chassis and positioned inwardly of said wheel, said scraping blade being adapted to scrape dirt and direct the same into the space between said blades during forward movement of said truck chassis for a subsequent compacting action by said wheel, and a leveling blade mounted on said sub-frame rearwardly of said wheels for moving outwardly with respect to said truck chassis excess quantities of dirt remaining after a compacting action.

LESTER T. ROSS.